(No Model.) 5 Sheets—Sheet 1.
C. WEGENER.
FIRING APPARATUS FOR USE WITH COAL DUST.
No. 475,715. Patented May 24, 1892.
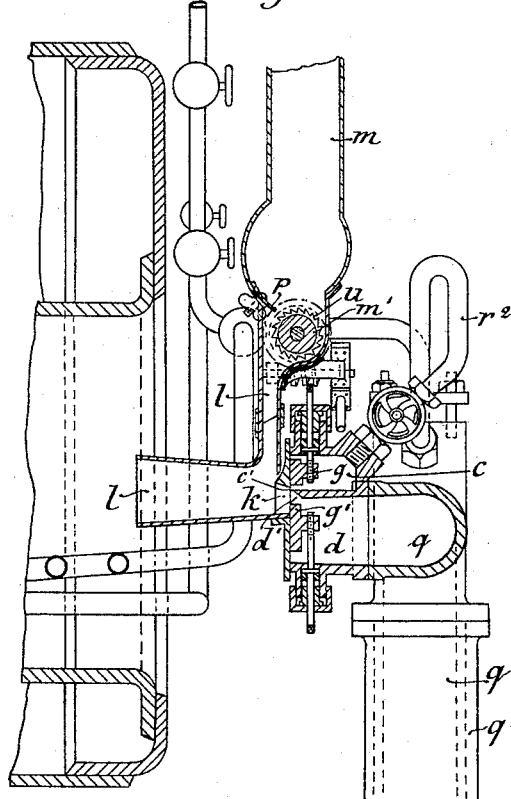
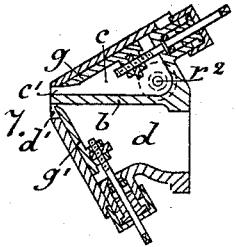
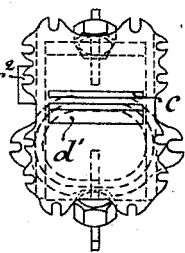
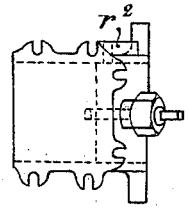
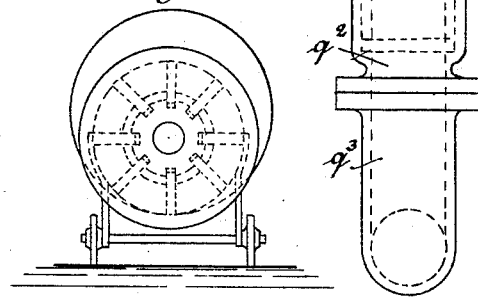
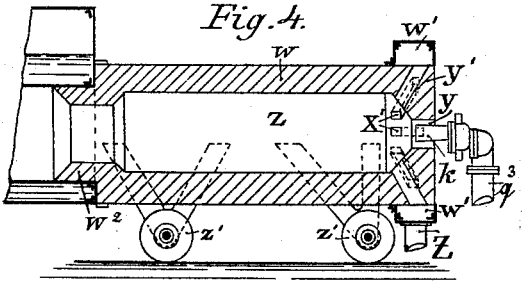
Witnesses:
Walter Allen
J. W. Mister
Inventor,
Carl Wegener.
by Herbert W. T. Jenner
Attorney (No Model.) 5 Sheets—Sheet 2.

C. WEGENER.
FIRING APPARATUS FOR USE WITH COAL DUST.

No. 475,715. Patented May 24, 1892.

Witnesses:
Walter Allen
J. V. Mister

Inventor
Carl Wegener.
by Herbert W. T. Jenner
Attorney

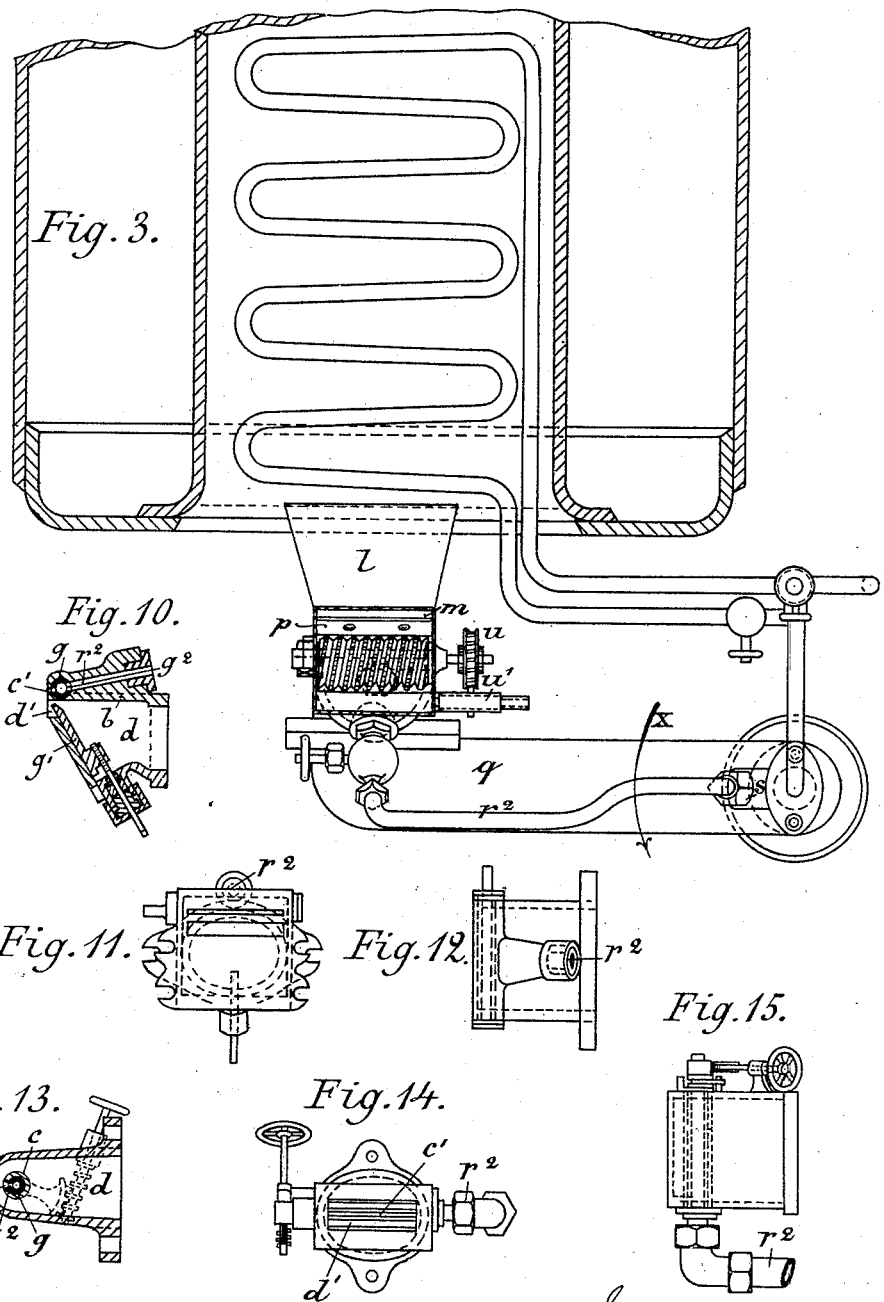

(No Model.) 5 Sheets—Sheet 4.
C. WEGENER.
FIRING APPARATUS FOR USE WITH COAL DUST.

No. 475,715. Patented May 24, 1892.

Witnesses:
Walter Allen
J. W. Mister

Inventor
Carl Wegener
by Herbert W. T. Jenner.
Attorney.

(No Model.) 5 Sheets—Sheet 5.
C. WEGENER.
FIRING APPARATUS FOR USE WITH COAL DUST.
No. 475,715. Patented May 24, 1892.
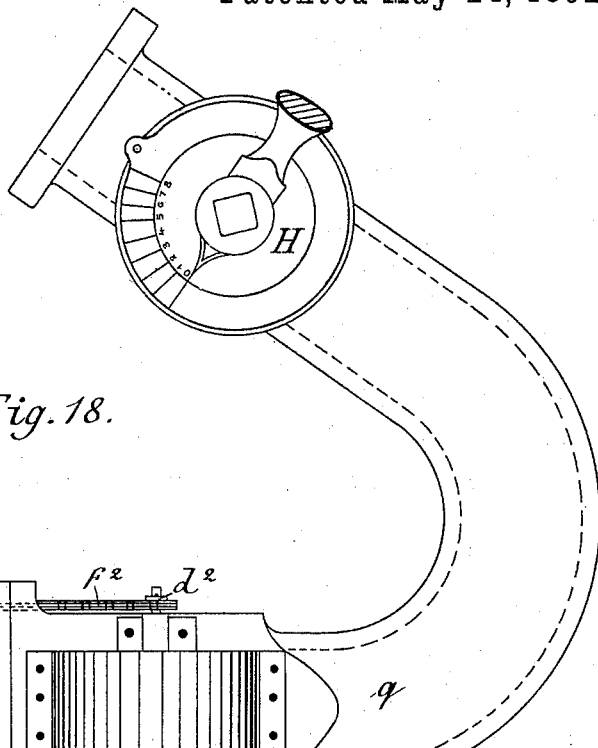
Fig. 18.
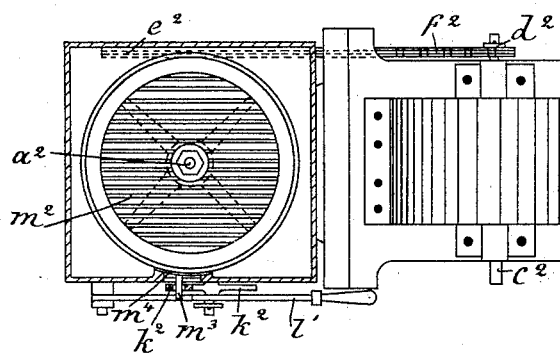
Fig. 19.
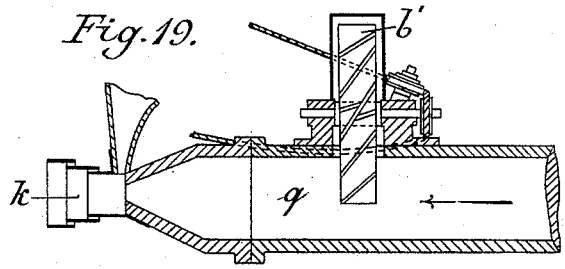
Fig. 20.
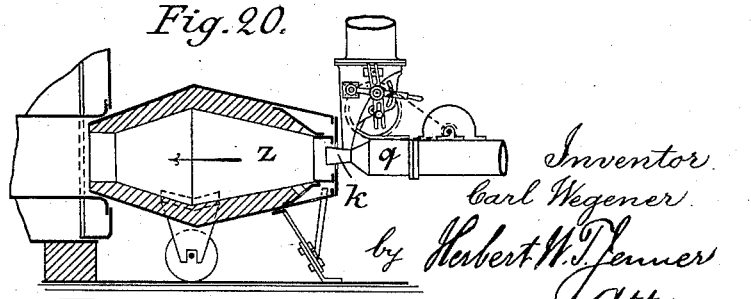
Witnesses:
Walter Allen
J. W. Mister
Inventor
Carl Wegener
by Herbert W. T. Jenner
Attorney.

UNITED STATES PATENT OFFICE.

CARL WEGENER, OF BERLIN, GERMANY, ASSIGNOR OF ONE-HALF TO PAUL BAUMERT, OF SAME PLACE.

FIRING APPARATUS FOR USE WITH COAL-DUST.

SPECIFICATION forming part of Letters Patent No. 475,715, dated May 24, 1892.

Application filed January 22, 1892. Serial No. 418,940. (No model.)

*To all whom it may concern:*

Be it known that I, CARL WEGENER, a subject of the King of Prussia and German Emperor, residing at Berlin, in the Kingdom of Prussia and German Empire, have invented certain new and useful Improvements in Firing Apparatus for Use With Coal-Dust; and I do hereby declare the following to be a full, clear, and exact description of the invention, such as will enable others skilled in the art to which it appertains to make and use the same.

This invention relates to the firing of furnaces, so that fine pulverized coal or other fuel may be used in such a way that the coal-dust is blown into the fixed or movable fire-box by means of steam or air, or by both of these mediums combined, and the combustion is effected there in a thoroughly smokeless manner.

Figure 2:
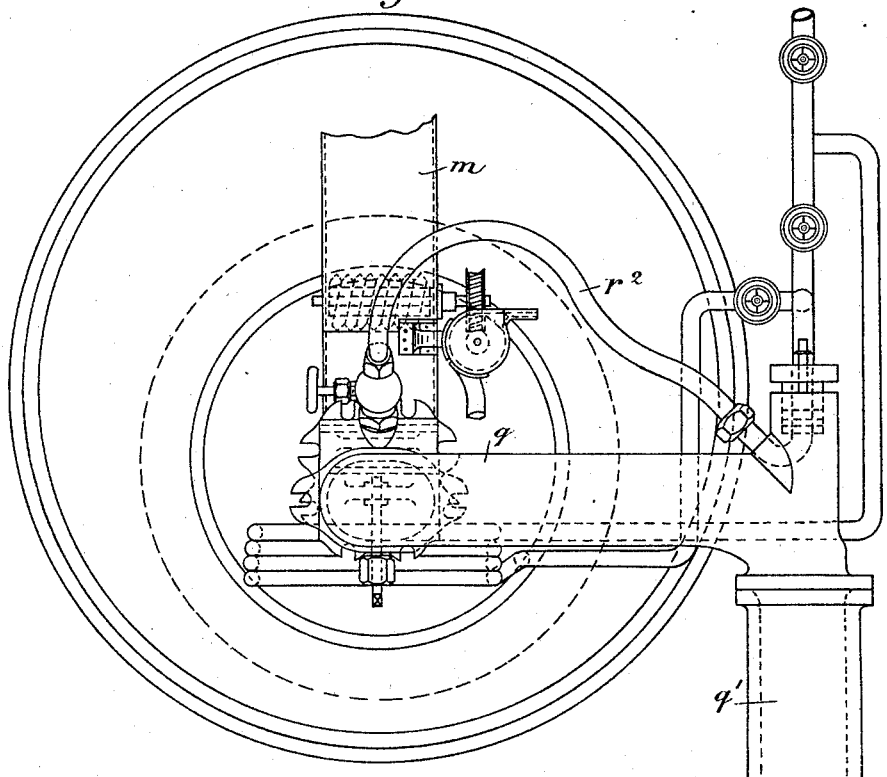
Figure 6:
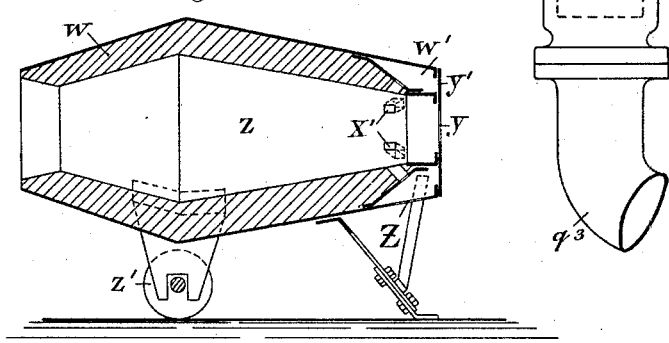
Figure 16:
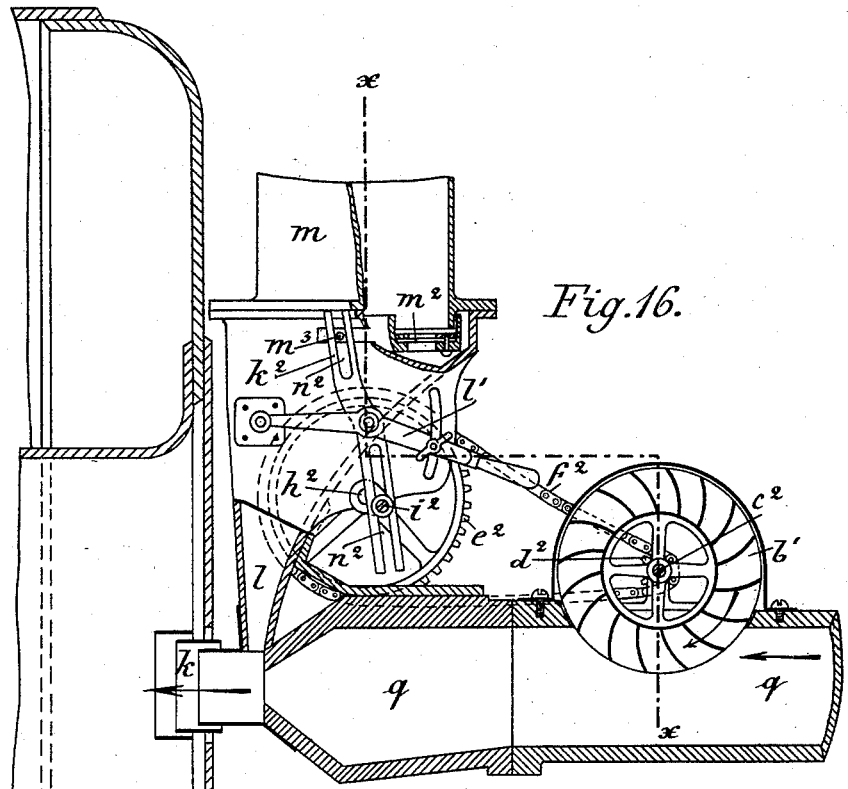
Figure 17:
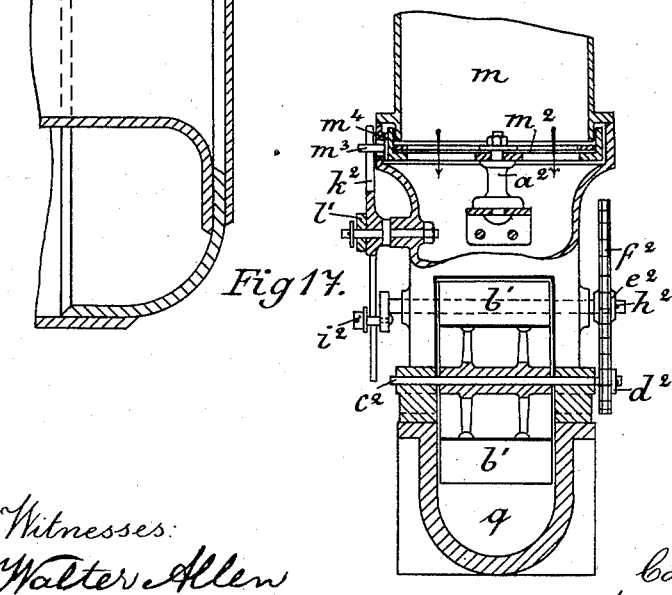

In the accompanying drawings, Figure 1 represents a vertical section through the apparatus; Fig. 2, a front view, and Fig. 3 a plan view, of the same; Figs. 4 and 5 show, respectively, a longitudinal section and an end view of a portable furnace which may be employed for steam-boilers and in which this method of firing is introduced. Fig. 6 shows a longitudinal section of a modified form in which these furnaces can be made. Figs. 7 to 15 represent modified details used in this arrangement of firing, partly in longitudinal section and partly in front or plan view. Fig. 16 shows a vertical longitudinal section of a modified form of the apparatus, and Fig. 17 a cross-section on the broken line $x\ x$ of Fig. 16, while Fig. 18 is a plan view. This form of apparatus is intended for pulverizing or disintegrating the somewhat-caked coal-dust and also, for actuating the apparatus for supplying the coal-dust. Fig. 19 shows a somewhat-altered form of the apparatus for actuating the conveying device. Fig. 20 shows this new arrangement in combination with the movable combustion-chamber, while Figs. 16 to 19 show the apparatus arranged as though the coal-dust were blown direct into the flue of a steam-boiler.

The coal-dust which it is intended to consume by means of this new firing arrangement is first placed in a receptacle $m$, Figs. 1 to 3, and there is situated at its lower widened end an exit-orifice, the degree of opening of which may be regulated by means of an adjustable slide $p$. A suitable appliance is placed beneath this orifice, by means of which the fuel continually passing from the receptacle $m$ to a passage $l$ is again finely subdivided in case it has caked, owing to moisture or the like cause. A crushing-roller $u$—such as is shown on the drawings, for instance—may be employed as a suitable medium, which is kept continuously revolving by means of any suitable actuating mechanism. A vibrating sieve or revolving bars or any other suitable device may, however, be employed in place of the crushing-roller. The coal-dust passes by means of the vertical part of the passage $l$ into the horizontal part of the same, from whence it is conveyed by means of steam or air, or a mixture of these two, which penetrates into the passage $l$ through a nozzle-like slot $k$, into the actual combustion-chamber, in order to be ignited by the heat prevailing there and by its combustion to develop the necessary heat for working a steam-boiler, as well as for igniting the succeeding portion of coal-dust blown into the fire-chamber. As before stated, the blowing of the coal-dust into the combustion-chamber is effected by means of steam or air or a mixture of both. This latter is carried out by the compressed air, which is introduced by means of a pipe $q^3$, Figs. 1 and 2, into a chamber $d$, together with the steam, which is introduced by means of a pipe $r^2$ into a chamber $c$, being simultaneously conveyed into the slot or opening $k$. The air reaches the opening $k$ from the chamber $d$ by means of an opening $d'$, regulated by means of a slide-valve $g'$, while the steam reaches the opening $k$ from the chamber $c$ by means of a vent $c'$, regulated by means of a slide-valve $g$. The slide-valves may be adjusted by hand or in any other suitable manner.

In order to be able to remove with facility the whole apparatus above described from the front of the boiler or fire-box, it is attached to the horizontal part $q$ of an elbow $q\ q'$ of the air-conduit, the vertical arm $q'$ of which rests movable in the vertical end piece $q^2$ of the air-conduit $q^3$. As the steam-pipe $r^2$ also has a hinged joint arranged in the axis of the vertical elbow part $q'$, the whole firing apparatus may be removed from the front of the combustion-chamber by simply moving the elbow-shank $q$ in the direction of the arrow $x$, Fig. 3. The firing apparatus may also be arranged on a separate furnace instead of being directly attached to the boiler, as shown in Figs. 1 to 3. Figs. 4 to 6 represent two different patterns of such separate furnaces which are suitable for being used with the above-described arrangement. In these $w$ is the fire-box coated with refractory material, which is surrounded at the front by an annular space $w'$, into which the air requisite for combustion passes from the air-pipe Z in so far as it is not supplied by the air-pipe $q^3$ in order to be conveyed from here by means of the passages $x'$ into the actual combustion-chamber $z$. The nozzle $k$ is inserted through a hole $y$ in the front wall $y'$ of the separate furnace. This latter is arranged on wheels $z'$ in such a way that it may be easily moved away from the boiler $k$, with the flue of which it is connected by means of an annular projection $w^2$.

Fig. 6 is a vertical longitudinal section of a somewhat-modified form of construction of the above-described separate furnace, and in which the same reference-letters denote the same parts as in Figs. 4 and 5, the modification consisting only in the duplex conical shape of the fire-chamber $z$, owing to which another shape is requisite for the annular air-admission chamber W′, and the annular projection $W^2$ is omitted, as the direct connection of the furnace with the flue of the boiler is directly effected by means of the conical shape of the end of the furnace itself.

In the modified shape of the blast appliances, as represented in Figs. 7 and 9, the faces of the valves $g$ $g'$ are no longer arranged in one and the same plane, as is the case with the arrangement shown in Figs. 1 to 3, but at an angle to each other of less than one hundred and eighty degrees. The result of this is that the air flowing through the chamber $d$ or its vent $d'$ is more thoroughly mixed with the steam passing through the vent $c'$ of the steam-chamber $c$ than is the case in the previous arrangement. The same result is obtained by the modified blast device shown in Figs. 10 to 12. In this, however, the flat steam-regulating valve is replaced by a round slide-valve $g$, which is provided with an intersection $g^2$, through which the steam brought by the passage $r^2$ must pass before emerging from the vent $c'$. The alteration of the size of the exit is brought about by turning the valve $g$. The directions of the exit of the air and steam form an angle, as shown in the arrangement in Fig. 7.

In the devices shown in Figs. 13 to 15 a round valve is also employed. The chamber $c$ containing the same, is, however, arranged within the chamber $d$, and, in fact, in such a way that the inflowing air must pass round the chamber $d$ in order to reach the exit-orifice $d'$. The round valve, revoluble in the chamber $c$, is hollow and projects so far from one end of the chamber $c$ that a steam-pipe $r^2$ may be attached to the same. The other end of the slide-valve also projects from the other end of the chamber $c$ and has the form of a plug, on which a toothed segment adjustable by means of a hand-wheel and screw is attached. The valve $g$ may be turned in such a way by the hand-wheel being revolved that its longitudinal orifice $g^2$, which allows the steam which has penetrated therein to escape, may be brought into or out of connection with the vent $c'$ of the steam-chamber $c$. The vent $c'$ of the chamber $c$ is thereby so controlled that the jet of steam emerging through the same passes in a direct line through the vent $d'$ of the chamber $d$, and thereby carries with it the air contained in the latter, if the latter be not forced into the chamber $d$ or through the vent $d'$ of the same into the combustion-chamber by means of special apparatus.

In the modified form of apparatus shown in Figs. 16 to 20, the coal-dust is, as previously described, shot into the hopper $m$, from whence, passing through a grating $m^2$, it reaches the exit $l$, in order to be blown through the nozzle $k$ by means of the current of air or steam coming from the pipe $q$, and which may be regulated by means of the cock H being suitably adjusted. The coal-dust may be blown either direct into the flue, Fig. 16, or else first through the portable combustion-chamber, Fig. 20. The above-mentioned grating $m^2$ is revolubly placed on a pivot $a^2$, Fig. 18, fixed in the hopper $m$ or its exit $l$, and its circumference fits to the walls of the hopper $m$ or of the exit $l$ in such a way that the coal-dust can only pass into the exit-orifice through the interstices in the grating, but not over the outer circumference of the grating. The interstices of the grating are adjusted according to the fineness and also the quantity of the coal which is to pass through. In order to again disintegrate any coal-dust which may have become caked, the grating $m^2$ is caused to rotate on its fixed pivot $a^2$, and this is effected by means of a paddle-wheel $b'$, which projects into the air-supply pipe $q$ or into the steam-supply pipe, which is not shown in this case, and in such a way that it is caused to rotate on its axis $c^2$ through the medium flowing through. This rotary motion is transferred to the feed-roller $m^4$ in any ordinary manner. If the feed-grating $m^2$ be used, the rotary motion of the paddle-wheel $b'$ may be replaced by the grating $m^2$ being caused to oscillate, which may be brought about in any suitable way. For instance, the paddle-wheel is on the accompanying drawings connected with the axle $h^2$ of a crank by means of a chain $f^2$ and the wheels $d^2$ $e^2$ belonging thereto, the crank-pin $i^2$ of which axle oscillates the grating $m^2$, as above-mentioned, by means of a twoarmed lever $k^2$. In order to allow the oscillating movement of the grating $m^2$ to be altered while the length of the crank-pin remains the same, the pivot of the lever $k^2$ is arranged on a lever $l'$, which may be adjusted by hand. By fixing this lever $l'$ in any desired position the pivot of the lever $k^2$ may be altered to a smaller or greater distance from the crank-axle $h^2$, and accordingly the movement of this lever or that of the grating may be altered. The connection of the grating $m^2$, as well as of the crank-axle $h^2$ with the lever $k^2$, is such that both the crank-pin $i^2$ and the draw-peg $m^3$ of the grating engage in suitable slots $n^2$ of the lever $k^2$. As the peg $m^3$ of the grating $m^2$ passes through the walls of the exit-tube $l$ surrounding the grating, in order to engage with the lever $k^2$ in order to prevent the coal from falling through the necessary orifice for allowing the peg $m^3$ to pass through, a valve $m^4$ or its equivalent must be adopted, which keeps the above-named orifice closed throughout the entire movement of the grating.

Instead of the paddle-wheel $b'$, (shown in Figs. 16, 17, and 18,) which is set in motion by a current of air directed vertically on its axis, a spirally-winged wheel which fills wholly or partly the diameter of the pipe $q$ may be employed for actuating the grating $m^2$—for instance, as shown in Fig. 19—and which is revolved by a current of air traveling in the direction of its axis.

In the arrangements shown in Figs. 16 to 19 it is assumed that the coal-dust is to be blown direct through the nozzle $k$ into the fixed combustion-chamber of a steam-boiler or some other furnace. The modified arrangement may, however, be employed in combination with a portable combustion-chamber in a similar manner to that previously described, which application of the modified arrangement is shown in Fig. 20.

What I claim is—

1. The combination, with a furnace, of a supply-pipe for the blast, pivoted vertically at one side of the furnace, and provided with a part $q$, extending laterally in front of the furnace, a receptacle for fine fuel, a disintegrator below the receptacle, and a nozzle adapted to receive the blast and the fuel and project them into the furnace, the said receptacle, disintegrator, and nozzle all being supported by the said part $q$ and adapted to be swung around clear of the front of the furnace, substantially as set forth.

2. The combination, with a supply-pipe for air and a supply-pipe for steam, both pivoted vertically and concentrically and provided, respectively, with the laterally-extending parts $q$ and $r^2$, of a nozzle supported by the said part $q$ and adapted to project the blast and the fine fuel within a furnace, a receptacle for the fuel, supported above the said nozzle, and means for regulating the issue of air and steam into the nozzle behind the fuel, substantially as described and shown.

3. The combination, with the supply-pipe for the blast pivoted vertically and provided with a laterally-extending part $q$, of a receptacle for fine fuel, a disintegrator below the receptacle, and a nozzle adapted to receive the blast and the fuel and project them within a furnace, all the said devices being carried by the said part $q$, a motor-wheel provided with a casing and projecting into the said part $q$, so that the wheel may be revolved by the blast, and driving devices operatively connecting the said motor-wheel with the said disintegrator, substantially as set forth.

In testimony whereof I affix my signature in presence of two witnesses.

CARL WEGENER.

Witnesses:
MARC M. ROTTEN,
SIEGFRIED HAMBURGER.